United States Patent [19]

McNaughton et al.

[11] Patent Number: 5,135,268
[45] Date of Patent: Aug. 4, 1992

[54] QUICK CONNECTOR

[75] Inventors: James McNaughton, Rochester Hills; Mark G. Ketcham, Marine City, both of Mich.

[73] Assignee: Huron Products Industries, New Haven, Mich.

[21] Appl. No.: 610,817

[22] Filed: Nov. 8, 1990

[51] Int. Cl.⁵ ............................................. F16L 33/18
[52] U.S. Cl. .................... 285/239; 285/319; 285/320; 285/351; 285/921
[58] Field of Search ............... 285/239, 319, 351, 921, 285/348, 320; 72/88; 29/446, 453, 450

[56] References Cited

U.S. PATENT DOCUMENTS

| | | |
|---|---|---|
| 2,626,974 | 1/1953 | Howard et al. . |
| 2,661,768 | 12/1953 | Novak et al. . |
| 3,190,095 | 6/1965 | Cooper et al. ............................ 72/88 |
| 3,314,696 | 4/1967 | Ferguson et al. . |
| 3,468,563 | 9/1969 | Duret . |
| 3,480,800 | 11/1969 | Jeffery et al. . |
| 3,526,417 | 4/1968 | Aumiller . |
| 3,538,940 | 11/1970 | Graham . |
| 3,584,902 | 6/1971 | Vyse . |
| 3,803,889 | 4/1974 | Muenchinger ........................... 72/88 |
| 3,881,392 | 5/1975 | Curtis . |
| 4,035,005 | 7/1977 | DeVincent et al. ................. 285/319 |
| 4,046,387 | 9/1977 | Lee . |
| 4,131,050 | 12/1978 | Holmes . |
| 4,258,943 | 3/1981 | Vogt et al. . |
| 4,293,257 | 10/1981 | Peterson . |
| 4,317,471 | 3/1982 | King, Sr. ........................ 285/319 X |
| 4,423,892 | 1/1984 | Bartholomew . |
| 4,572,552 | 2/1986 | Orevik et al. . |
| 4,575,130 | 3/1986 | Pemberton et al. . |
| 4,603,890 | 8/1986 | Huppee .............................. 285/239 |
| 4,614,120 | 9/1986 | Fradin et al. . |
| 4,618,171 | 10/1986 | Fahl . |
| 4,637,640 | 1/1987 | Fournier et al. ..................... 285/319 |
| 4,659,119 | 4/1987 | Reimert . |
| 4,681,351 | 7/1987 | Bartholomew ...................... 285/319 |
| 4,703,957 | 11/1987 | Blenkush . |
| 4,712,810 | 12/1987 | Pozzi . |
| 4,749,214 | 6/1988 | Hoskins et al. .................. 285/319 X |
| 4,775,170 | 10/1988 | Usui et al. ....................... 285/319 X |
| 4,793,637 | 12/1988 | Laipply et al. ................... 285/319 X |
| 4,834,423 | 5/1989 | DeLand ........................... 285/319 X |
| 4,846,506 | 7/1989 | Bocson et al. .................. 285/319 X |
| 4,875,709 | 10/1989 | Caroll et al. .................... 285/319 X |
| 4,948,180 | 8/1990 | Usui et al. ......................... 285/319 |
| 4,979,765 | 12/1990 | Bartholomew ................. 285/319 X |
| 5,064,227 | 11/1991 | Spors et al. ......................... 285/319 |

FOREIGN PATENT DOCUMENTS

| | | |
|---|---|---|
| 22568 | 6/1948 | Finland . |
| 1544720 | 7/1968 | France . |
| WO84/03927 | 10/1984 | PCT Int'l Appl. . |
| 215389 | 9/1941 | Switzerland . |
| 966842 | 8/1964 | United Kingdom . |

OTHER PUBLICATIONS

IBM Technical Disclosure Bulletin, vol. 17, No. 7, Dec. 1974.

*Primary Examiner*—Randolph A. Reese
*Assistant Examiner*—Heather Chun
*Attorney, Agent, or Firm*—Dykema Gossett

[57] ABSTRACT

A connector assembly has a metallic female housing socket. The female housing socket has a pair of flanges substantially perpendicular to the axis of the socket to retain sealing rings and a conduit retainer within the socket. The socket also has one or more barb corners on its stem to enhance retention of a conduit onto the stem.

16 Claims, 1 Drawing Sheet

QUICK CONNECTOR

BACKGROUND AND SUMMARY OF THE INVENTION

The present invention relates to quick connectors and, more particularly, to female connector housings formed from metallic materials.

In manufacturing fields, such as automotive, trucks or the like, it is customary to employ quick connect devices to connect conduits or the like together. While conduits, such as piping can be connected in a variety of ways, which include threaded couplings for efficient assembly of the mechanisms, it is desirable to have available a fluid coupling which can be attached very expeditiously but which at the same time, once attached, is substantially fail safe. Various types of couplings have been provided to be utilized in connecting of conduits.

Turning to FIG. 1, a female housing socket which applicant has currently been using is illustrated as relevant art. The socket is designated with the reference numeral 1 and includes a body portion 2 and a stem portion 3. The body portion 2 includes a retainer housing portion 4, a sealing means housing portion 5 and a conduit tip housing portion 6. The retainer housing portion 4 and sealing means housing portion 5 are separated by a double step portion 7. Generally, the retaining housing portion 4, sealing means housing portion 5, conduit tip housing portion 6 and dual step portion 7 all include right cylindrical walls connected by curved inward flanges. The retaining housing portion 4 at its free end includes an inward turned flange 8 defining an opening to enable insertion of a conduit. The stem 3, generally formed from a cylindrical wall, has a pair of bulges, 9 and 10, the bulge 10 ending with a frustro-conical tip 11. While the socket 1 functions satisfactorily for its intended purpose, designers continue to strive to improve the art.

Accordingly, the present invention provides the art with an improved female housing socket. The present invention provides the art with a socket which requires less material to provide cost saving benefits. The present invention has an overall body length which is less than currently used sockets. The female socket also provides an abutting shoulder to reduce the displacement of 0-rings during insertion of the conduit. The present invention provides barb corners on the stem and an annular groove to seat an O-ring to enhance sealing of a conduit to the stem.

From the following detailed description taken in conjunction with the accompanying drawings and subjoined claims, other objects and advantages will become apparent to those skilled in the art.

DETAILED DESCRIPTION OF THE PREFERRED EMBODIMENT

Figure 1:
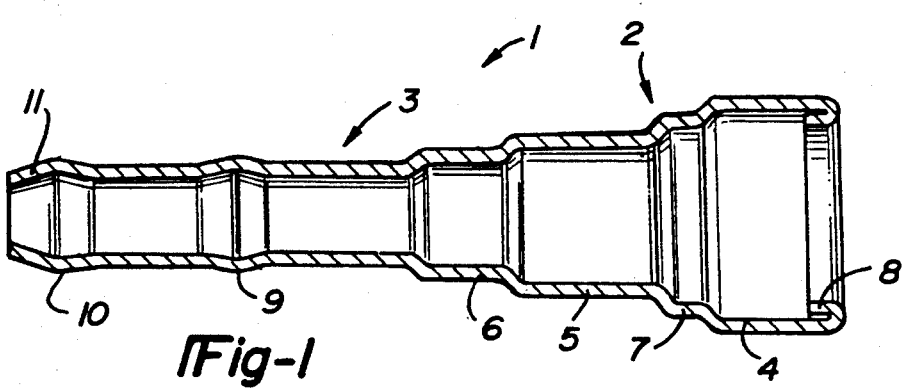
FIG. 1 is a sectional view of a relevant art device.
Figure 2:
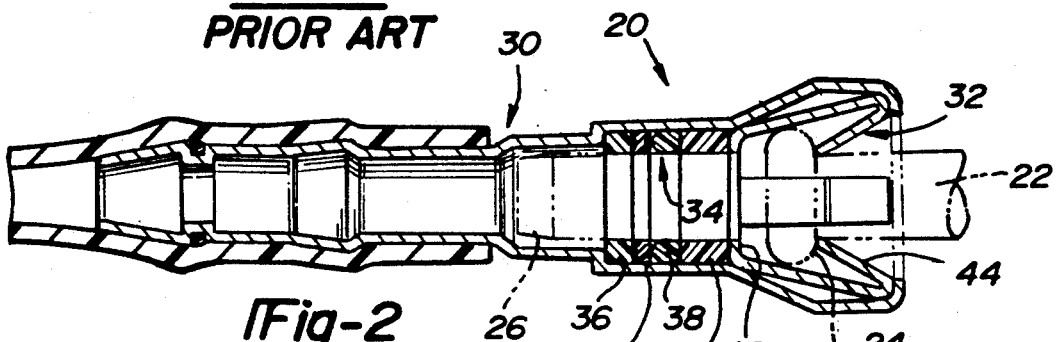
FIG. 2 is a sectional view of a connector assembly in accordance with the present invention.

Referring to the figures, particularly FIG. 2, a connector assembly is illustrated in accordance with the present invention and designated with the reference numeral 20. The connector 20 includes a male conduit 22 with an annular bead 24 and a tip 26 and a female socket housing 30. The female socket housing 30 houses a retainer 32 which retains the annular bead 24 which, in turn, locks the conduit 22 within the housing 30. Also, a sealing means 34 is housed within the female socket 30. The sealing means 34 generally includes a pair of 0-rings 36 and 38 and bushings 40 and 42. The retainer 32 includes a plurality of arms 44 and an annular ring 46 which define openings to enable passage of the conduit 22 therethrough as seen in FIG. 2.

Figure 3:
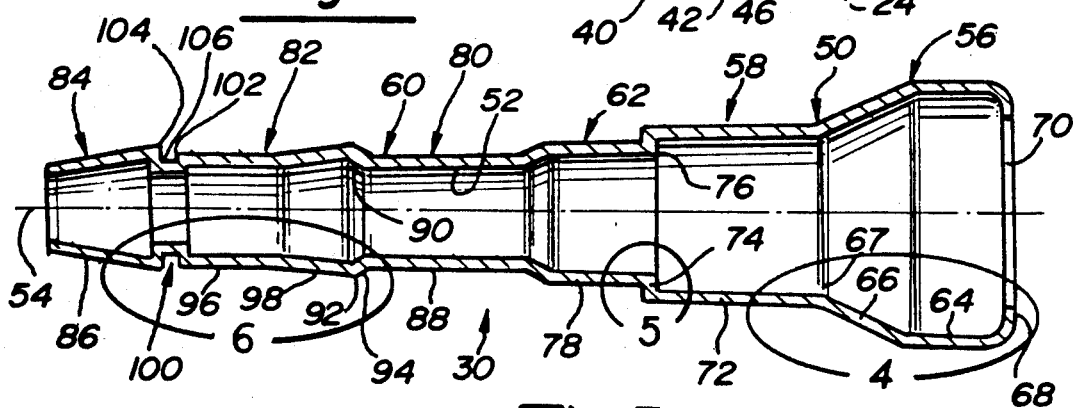
FIG. 3 is a sectional view of the female housing socket of FIG. 2.

Moving to FIG. 3, the female socket housing 30 is illustrated. The female socket housing includes a body portion 50 and a stem portion 60. An axial bore 52 passes through the body 50 and stem 60 defining an axis 54. The axial bore is continuous through the socket 30 and has enlarged diameter step portions which will be explained herein.

The body 50 includes a retainer housing portion 56, a sealing means housing portion 58 and a conduit tip housing portion 62. The retainer housing portion 56 includes a right cylindrical wall portion 64 continuous at one end with a frustro-conical shaped wall portion 66 defining an increased diameter portion of the axial bore 52. The other end of the right cylindrical wall portion 64 is continuous with a radially inward extending flange 68.

The flange 68 defines an opening 70 which enables passage of the conduit into the socket 30. The flange 68 in cross section is in a plane which is substantially perpendicular to the right cylindrical wall 64 and axis 54 as seen in FIG. 3. The flange 68 provides an abutting surface for the retainer 32 as can be seen in FIG. 2 to provide force against withdrawal of the retainer 32 to maintain the sealing means 34 and conduit 22 within the housing.

Figure 4:
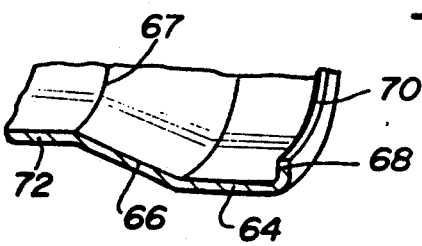
FIG. 4 is an enlarged partial perspective sectional view of FIG. 3 within circle 4.

The frustro-conical shaped wall portion 66 has its larger end continuous with the cylindrical wall portion 64. The smaller end is continuous with the sealing means housing portion 58. The frustro-conical shaped wall portion 66 is at an acute angle with respect to the axis 54 from about 15 to about 20 degrees. The frustro-conical shaped portion provides for aligning the retainer 32 within retainer housing portion 56. Also, the frustro-conical shaped wall portion 66 enables the tooling and forming process to be simplified. Likewise, with the removal of the dual step portion, the connection of the smaller end of the frustro-conical shaped wall portion 66 with the sealing means housing wall portion 58 reduces the forming stress during manufacture of the socket. Also, the junction of the smaller end provides a uniform lip 67, which is in a plane perpendicular to the axis 54, to position the ring 46 of the retainer 32 within the housing as seen in FIGS. 3 and 4.

Figure 5:
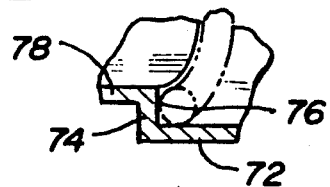
FIG. 5 is an enlarged partial perspective sectional view of FIG. 3 within circle 5.

The sealing means housing portion 58 includes a right cylindrical wall 72 has its axis coincident with axis 54 and defines another enlarged diameter portion of the axial bore. One end of the wall 72 is continuous with the frustro-conical wall 66. The other end of the right cylindrical wall 72 includes a radially extending inwardly flange 74. The flange 74 is in a plane which is substantially perpendicular to the axis 54. The flange 74 forms a shoulder within the axial bore providing an abutment surface for the 0-ring 36 as seen in FIG. 5. The substantially perpendicular flat planar abutment surface 76 reduces the incidence of displacing the 0-ring as the conduit 22 is passed into the socket as seen in FIG. 2.

The conduit tip housing portion 62 includes a right cylindrical wall 78 continuous with the flange 74 and substantially perpendicular thereto. The wall 78 has an axis coincident with the axis 54 and defines another enlarged diameter portion of the axial bore. The wall 78 at its other end is continuous with the stem 60.

The stem 60 includes a first, second and third cylindrical wall portion 80, 82 and 84 with the first cylindrical wall portion 80 continuous with the conduit tip housing portion 62. The third cylindrical portion 84 is a frustro-conical shaped wall 86 which forms a tip at the free extending end of the stem 60 to enhance entrance of the socket 30 into a conduit. The first cylindrical portion 80 includes a right cylindrical wall 88 continuous at one end with the wall 78. The right cylindrical wall 88 is coincident with the axis 54. The other end of the right cylindrical wall 88 has a radially outward extending flange 90 continuous with the second stem portion 82.

Figure 6:
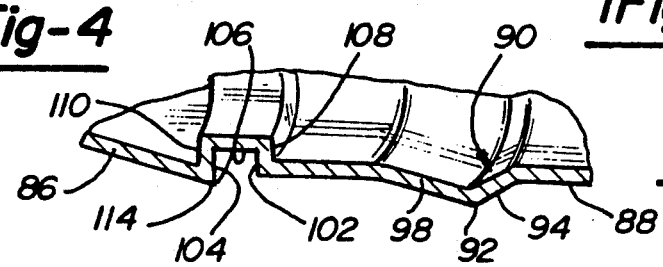
FIG. 6 is an enlarged partial perspective sectional view of FIG. 3 within circle 6.

The flange 90 is frustro-conically shaped forming an exterior shoulder or barb corner 92 at the junction of the first and second stem portions 80 and 82 as seen in FIG. 6. The barb 92 provides enhanced securement of the conduit secured onto the stem 60. The flange 90 has an exterior face 94 at an acute angle with respect to the axis 54.

The second stem portion 82 includes a right cylindrical wall portion 96 and a frustro-conical shaped wall portion 98. The frustro-conical shaped portion 98 has its larger end continuous with the flange 90 forming the barb 92 on the exterior of the socket. The smaller end of the frustro-conical shaped wall 98 is continuous with the right cylindrical wall 96. The right cylindrical wall portion 96 includes an annular groove 100 formed at its other end. The annular groove 100 is formed on the exterior surface of the socket 30 and has an overall U-shape in cross section as seen in FIGS. 3 and 6. The U is defined by sidewalls 102, 104 and web 106. The sidewalls 102 and 104 are substantially parallel to one another and perpendicular to the axis 54.

Sidewalls 102 and 104 are the exterior surfaces of radially inward flanges 108 and 110, which extend inwardly into the axial bore. The flange 110 with exterior wall 104 is continuous with the frustro-conical wall 86 of the third portion 84. The junction of the wall 104 and exterior of the wall 86 form a barb corner 114 for enhancing retention of a conduit on the socket 30. The annular groove 100 and flange 90 are formed by a roll formed method as will be explained herein.

The socket 30 is generally formed by the following process. A thin gage disk of metallic material is placed into an up set forming press. The press has a series of male punches and female tools. The disk is contacted by the first punch and tool and formed into a cup shape. The cup is moved sequentially through an automated process from punch to punch to form the socket 30. As the cup is sequentially passed through the automated process from punch to punch in the up set eyelet tooling, at one step the retaining portion 56 is formed, at another step, the sealing means housing portion 58 is formed, another step, the conduit tip housing portion 62 is formed, as additional steps are carried out, the stem is formed. As the steps continue, the flange 74 is formed. Towards the end of the process, as the stem is formed, bulges are formed in the socket at the area where the flange 90 and annular groove 100 are to be formed. During the sequential process, while the socket is withdrawn from a tool after forming of the bulges, the socket is roll formed by rollers to produce the barbed corner 92, annular groove 100 and barbed corner 114. This rolling process is performed during the sequential process to provide the socket with defined barbed corners which enhance the sealing of a conduit to the stem. The socket continues through its sequence of additional punch and eyelet tool steps to provide proper inside and outside diameter sizes. After the eyelet punching sequence is finished, the socket 30 in FIGS. 2–6 is formed from the process.

While the above detailed description provides a preferred embodiment of the present invention, it will be understood that the present invention is susceptible to modification, variation and alteration without deviating from the scope and true meaning of the subjoined claims.

What is claimed is:

1. A female socket housing for a connector assembly comprising:

a one-piece cylindrical hollow body with an extending hollow stem at one end of said body, an axial bore extending through said stem and said body and having a central axis; and said body including a first cylindrical wall portion inner and outer walls, substantially parallel to said axis having a radially inward extending flange in a plane substantially perpendicular to said axis defining a shoulder within the axial bore, said shoulder providing an abutting surface, a frustro-conical shaped inner and outer wall portion defining a frustro-conical portion of said axial bore and having its smaller end continuous with said first wall portion, a second cylindrical wall portion defining inner and outer cylindrical walls continuous with the larger end of said frustro-conical shaped inner and outer wall portion, said second wall portion having an axis substantially coincident with said axis, and a radially inward extending flange at the other end of said second wall portion defining an opening into said socket, said flange being in a plane substantially perpendicular to said axis and defining a shoulder in said axial bore in a plane substantially perpendicular to said axis, said shoulder providing said socket with an abutting surface, said frustro-conical and second wall portions being adapted to receive a retainer means;

said stem including a cylindrical wall portion define an inner and outer cylindrical walls continuous with said body first wall portion having a radially outwardly extending shoulder defining an outwardly extending portion of said bore and having an exterior face at an acute angle with respect to said axis forming a barb for retaining a conduit on said stem, and an annular groove in said stem cylindrical wall adapted for receiving a sealing ring, said groove defined by an abutment surface being in a plane substantially perpendicular to said axis and extending into said axial bore, and a frustro-conical tip at the end of said stem cylindrical wall enhancing insertion into a conduit.

2. The housing according to claim 1 wherein said stem further includes a second frustro-conical wall portion at the end of said stem first cylindrical wall continuous with said abutment surface.

3. The housing according to claim 2 wherein said stem further includes a third cylindrical wall portion and a forth frustro-conical wall portion continuous with one another and continuous with said annular groove and said barb.

4. The housing according to claim 1 wherein said body further including a forth cylindrical wall portion continuous with said radially inward flange and said stem, said forth cylindrical wall portion adapted to house a tip of a conduit inserted into said housing.

5. The housing according to claim 4 wherein said body first, third and forth cylindrical wall portions are right cylindrical wall portions.

6. The subject matter of claim 1, wherein said barb is formed by roll forming.

7. The subject matter of claim 1, wherein said annular groove is formed by roll forming.

8. A female housing for a connector assembly comprising:
- a cylindrical hollow body with an extending hollow stem at one end of said body, an axial bore defining an axis through said stem and said body;
- said body including a retainer housing portion, a sealing means housing portion and a conduit tip housing portion, said retainer housing portion including an opening at one end for enabling passage of a conduit and continuous with said sealing means housing at its other end, said tip housing portion being continuous with said stem and said sealing means housing portion;
- said retainer housing portion including:
- first frustro-conical shaped inner and outer wall portions each having the smaller end continuous with said sealing means housing portion and first cylindrical inner and outer wall portions continuous with the larger end of said first frustro-conical shaped wall portion, said first cylindrical wall portion having it axis substantially coincident with said axis, and a radially inward extending flange at the other end of said first cylindrical wall portion defining said opening into said housing, said flange being on a plane substantially perpendicular to said axis and defining a shoulder to act as an abutting surface in said axial bore adapted for retaining a retainer in said retainer housing by abutting arms of the retainer to maintain the retainer in said housing.

9. The housing according to claim 8 wherein said frustro-conical wall portion angle enhances centering of the retainer within said retainer housing portion.

10. A female housing for a connector assembly comprising:
- a cylindrical hollow body centered on an axis with an extending hollow stem at one end of said body, an axial bore defining an axis through said stem and said body;
- said body including a retainer housing portion, a sealing means housing portion and a conduit tip housing portion, said retainer housing portion including an opening at one end for enabling passage of a conduit and continuous with said sealing means housing at its other end, said tip housing portion being continuous with said stem and said sealing means housing portion;
- said stem including a cylindrical wall portion continuous with said conduit tip housing portion, a radially outwardly extending shoulder having an exterior face at an acute angle with respect to said axis forming a barb corner for retaining a conduit on said stem, and an annular groove in said stem cylindrical wall adapted for receiving a sealing ring, said groove defined in-part by a first abutment surface extending in a plane substantially perpendicular to said axis for a first distance and providing a second barb corner on the exterior of said stem, said groove being further defined by a second abutment surface spaced axially toward said retainer housing portion from said first abutment surface, said second abutment surface extending in a plane substantially perpendicular to said axis for a second distance which is less than said first distance and a tip at the end of said stem cylindrical wall enhancing insertion into a conduit.

11. The housing according to claim 10 wherein said stem further includes a second frustro-conical wall portion at the end of said stem cylindrical wall continuous with said abutment surface.

12. The housing according to claim 10 wherein said stem further includes a third cylindrical wall portion and a forth frustro-conical wall portion continuous with one another and continuous with said annular groove and said barb.

13. The subject matter of claim 10, wherein said barb is formed by roll forming.

14. The subject matter of claim 10, wherein said annular groove is formed by roll forming.

15. A connector assembly comprising:
- a male conduit having an outward annular bead spaced from its end and a metallic female socket housing for receiving said male conduit, the female socket housing including;
- a cylindrical hollow body with an extending stem at one end of said body, an axial bore defining an axis through said stem and said body,
- said body including a retainer housing portion, a sealing means housing portion and a conduit tip housing portion, said retainer housing portion including an opening at one end for enabling passage of a conduit and continuous with said sealing means housing portion at its other end, said tip housing portion being continuous with said stem and said sealing means housing portion;
- retainer means for retaining said conduit in said female socket housing, said retainer means housed in said body retainer housing portion;
- sealing means for sealing said conduit in said female socket housing, said sealing means housed in said body sealing means housing portion;
- said sealing means housing portion including a right cylindrical wall portion with its axis coincident with said axis, a radially inward extending flange substantially perpendicular to said right cylindrical wall portion defining a shoulder acting as an abutting surface within the axial bore on a plane substantially perpendicular to said axis, said shoulder abutting with an O-ring seal of said sealing means for reducing displacement of the O-ring seal during insertion of said conduit;
- said retainer housing portion including, a first frustro-conical shaped wall portion having its smaller end continuous with said sealing means housing portion and a second cylindrical wall portion continuous with the larger end of said first frustro-conical shaped wall portion, said second wall portion having its axis substantially coincident with said axis, and a radially inward extending flange at the other end of said second wall portion defining said opening into said housing, said flange being on a plane substantially perpendicular to said axis and defining a shoulder to act as an abutting surface in said axial bore for retaining said retainer means in said retainer housing;

said stem including a first cylindrical wall portion continuous with said conduit tip housing portion, a radially outwardly extending shoulder having an exterior face at an acute angle with respect to said axis forming a barb corner for retaining a conduit on said stem, and an annular groove in said stem cylindrical wall adapted for receiving a sealing ring, said groove defined by an abutment surface in a plane substantially perpendicular to said axis providing a second barb corner on the exterior of said stem and a tip at the end of said stem cylindrical wall enhancing insertion into a conduit.

16. A connector assembly comprising:

a male conduit having a radially outwardly extending annular bead;

a metallic female socket housing for receiving said male conduit, said female socket housing including, a hollow body extending between a first and second end, an axial bore defining an axis through said body, said body including a retainer housing portion adjacent said second end, said retainer housing portion including an opening for enabling passage f said male conduit into said female socket housing, said opening being defined by an integral, radially inwardly extending flange which is substantially perpendicular to a wall portion of said socket body, said radially inwardly extending flange having a planar inner face perpendicular to said axis and defining an abutment surface at said second end of said female socket housing; and a retainer having a plurality of legs extending axially and radially inwardly from said second end of said socket housing toward first end, said retainer legs having an inner peripheral surface spaced from said axis by a first distance adjacent said abutment surface, and an inner peripheral surface of said legs spaced by a second distance adjacent said outward annular bead on said male conduit, said second distance being less than the distance to the outer periphery of said annular bead such that said legs retain said male conduit within said female socket housing, said legs having a bend adjacent said second end of said female socket housing, said bends on said legs abutting said abutment surface to retain and position said retainer within said female socket housing, said female socket housing includes a frusto-conical wall portion extending axially toward said first end from a cylindrical wall portion, said frusto-conical wall portion having frusto-conical inner and outer wall portions, with said retainer being axially aligned with said inner frusto-conical wall portion, and said inner frusto-conical wall portion being positioned adjacent to and radially outward of said retainer so as to assist in centering said retainer within said female socket housing.

* * * * *